July 24, 1951

R. H. VARIAN

2,561,490

METHOD AND MEANS FOR CORRELATING NUCLEAR PROPERTIES OF ATOMS AND MAGNETIC FIELDS

Filed Oct. 21, 1948

INVENTOR
RUSSELL H. VARIAN
BY
Paul B Hunter
ATTORNEY

INVENTOR
RUSSELL H. VARIAN
BY
Paul B. Hunter
ATTORNEY

July 24, 1951  R. H. VARIAN  2,561,490
METHOD AND MEANS FOR CORRELATING NUCLEAR PROPERTIES
OF ATOMS AND MAGNETIC FIELDS
Filed Oct. 21, 1948  4 Sheets-Sheet 3

INVENTOR
RUSSELL H. VARIAN
BY
Paul B. Hunter
ATTORNEY

July 24, 1951 — R. H. VARIAN — 2,561,490
METHOD AND MEANS FOR CORRELATING NUCLEAR PROPERTIES OF ATOMS AND MAGNETIC FIELDS
Filed Oct. 21, 1948 — 4 Sheets-Sheet 4

INVENTOR
RUSSELL H. VARIAN
BY
Paul B. Hunter
ATTORNEY

Patented July 24, 1951

2,561,490

UNITED STATES PATENT OFFICE 2,561,490

METHOD AND MEANS FOR CORRELATING NUCLEAR PROPERTIES OF ATOMS AND MAGNETIC FIELDS

Russell H. Varian, Cupertino, Calif., assignor to Varian Associates, San Carlos, Calif.

Application October 21, 1948, Serial No. 55,667

13 Claims. (Cl. 175—183)

1

This invention relates generally to the correlation of nuclear properties of atoms and magnetic fields and more particularly to the measurements of magnetic fields.

The objects of this invention are: to correlate magnetic fields and nuclear precession rates; to measure weak magnetic fields with high accuracy; to measure the magnetic effects of currents circulating in the earth; to measure the susceptibility of the earth to artificially generated magnetic fields; to measure magnetic fields spontaneously generated within the earth; to locate magnetic objects under water or under land; to give warning of the approach of craft constructed of ferro-magnetic materials; to detect the presence of chemical elements in a sample of matter.

In order to explain this invention, it is first necessary to acquaint the reader with a few of the known facts about the structure of the atom, and for this purpose we present the following rather brief statement. More extended treatment can be found in any text on atomic theory; the one that follows merely states the facts without adducing proof, and omits many important features not of interest here.

Any atom consists of a small heavy, positively charged center, called the nucleus, surrounded by a relatively extensive diffuse cloud of electrons. Normally the total charge of the atom is zero, so that the nucleus carries a positive charge equal to the negative charge of the external electrons. The nucleus then contains all of the positive charge and most of the mass associated with any atom. When one wishes to specify these quantities, they are usually measured in terms of the chareg of the electron $e$, and the mass of a proton, or hydrogen nucleus. The usual symbols are $Z$ and $M$, a nucleus with atomic number $Z$ and mass number $M$ having a positive charge of $Ze$ and a mass $M$ times the mass of a proton.

Under all ordinary circumstances, the atom's interactions with the external world occur by way of its external cloud of electrons and so the arrangement of these electrons determines the gross, or chemical properties of the atom. Thus oxygen and nitrogen have different chemical properties because their external electrons are differently arranged. This arrangement depends, naturally enough, on the number of electrons per atom. This number depends, in turn, on the nuclear charge $Z$, so that if we know the nuclear charge and so the number of electrons, we know the chemical species. It is for this reason that $Z$ is called the atomic number, since it specifies the chemical species of atom.

2

In addition to charge, the nucleus has mass. If, for example, we measure the mass of oxygen nuclei, we find that most of them have mass 16, and a few have mass 17 and 18. Such atoms, with the same number of electrons and so the same chemical poperties, but different masses, are called isotopes.

Generally speaking, the mass numbers are roughly twice the corresponding atomic numbers, and the number of isotopes for a given $Z$ increases as $Z$ increases. That is, for the lighter chemical elements there are, for any given $Z$, only a few possible values of $M$, while for the heavier elements a number of different masses are possible for a given $Z$.

Ordinarily, the various isotopes occur in nature in fixed proportions. For example, chlorine has two isotopes of masses 35 and 37, and these always occur in a mixture such as to give a mean mass, or chemical atomic weight, of 35.5.

In addition to charge and mass, discussed above, the nucleus may have other properties. Two important ones that have been discovered are spin and magnetic moment.

It has been known for some time that the nuclei may have spin or angular momentum i. e. may act like a small gyroscope. Part of this angular momentum comes from the angular momentum, or spin, of the elementary particles which go to make up the nucleus, and part comes from the revolution of the component particles about the center of mass. For the present purposes, we need not be concerned with the rather imperfectly understood details of the intra-nuclear motions; all we need to know is that the nucleus as a whole has a total angular momentum. By well verified quantum laws, this angular momentum must be a multiple of $a/2\pi$ where $h$ is Planck's constant. If we write the angular momentum as $I\,h/2\pi$ then I may have the values of 0, 1/2, 1, 3/2 etc., but intermediate values never occur. It should be pointed out that a particular species of nucleus with a particular value of $M$ and $Z$ never changes its value.

This nuclear angular momentum or spin has been measured for a number of nuclei and it is found that, while it might, in principle, have any integral or half integral value, no value greater than 9/2 has ever been observed. It follows that with only ten spin values and some hundreds of nuclei, in general many different nuclei can be found having a given spin value. No simple relation between Z and/or M and the spin has been found, except that nuclei with an even M often have zero spin. Thus, one cannot predict from Z and M the spin value of an atom. Its value must be measured.

One might expect that a body, such as a nucleus, containing charged particles which are known to have a total angular momentum, might also exhibit magnetic properties due to the motion of the charged particles. This expectation is verified and nuclei in general behave as if they contained circulating currents. The magnitude of such currents is best measured by the magnetic moment $\mu$ exhibited by the nucleus. A convenient unit is the nuclear magneton $= eh/4Mc$, with $e$ the charge of the electron, $h$ Planck's constant, $M$ the proton mass and $c$ the velocity of light.

A number of nuclear magnetic moments have been measured and it is observed that: ($a$) if the spin is zero, the magnetic moment is likewise, ($b$) although only integral or half integral values of I are possible, any value of $\mu$ may occur and ($c$) no simple general relation between Z, M, I, and $\mu$ has been found.

Thus any given nucleus has at least four properties: its charge, which determines the chemical properties of the associated atom; its mass; its spin or gyroscopic moment; and its magnetic moment.

Now a nucleus with given Z and M values will also have definite values of I and $\mu$ and these values of I and $\mu$, if they can be determined, will determine Z and M values, so that a method of measuring I and $\mu$ is, in general, a method of determining Z and so is a method of chemical analysis. It is also clear that if a pure sample of matter is used having known values of I and $\mu$, it is possible by measurement of the precession frequency to measure the strength of the magnetic field. The present invention is a method of correlating I, $\mu$, H and F, where H is the magnetic field and F is the frequency, and appears to be most useful as a means of determining H when I, $\mu$ and F are known, especially when H is small.

Before describing the present invention in detail, it will be useful to explain the behavior of nuclei or other systems with angular momentum under the influence of torques.

Consider first what happens when a nucleus is placed in a constant magnetic field H which we will suppose to be in the vertical direction. Since the nucleus will generally have a magnetic moment, just as a compass needle has magnetic moment, one would at first expect the nuclear moment to line up with the applied magnetic field, just as the moment of the compass needle lines up with the earth's field. Actually, this is usually what happens eventually, but the process is more complex than appears at first sight.

This complexity arises because the nuclear magnetic moment is associated with a mechanical angular momentum so that gyroscopic effects arise.

Since this angular momentum is a multiple of Planck's quantum constant, one might expect that a quantum mechanical treatment would be needed, but it has been shown by Kramers that in systems of the type here considered, which have only one spin and one moment value, the quantum mechanical and the classical treatments must always lead to the same result and so one may, without prejudice, use either description. We choose here to use the language of classical mechanics since it is more familiar to the general reader.

Returning here to the case of a system with angular momentum and a torque caused by the interaction between the nuclear magnetic moment and the external magnetic field, we observe that since the magnitude of the angular momentum is fixed, the only possible change in it is the orientation. This orientation of the angular momentum vector changes steadily but always maintains a constant angle with the magnetic field, so that the momentum vector moves on the surface of a cone with axis parallel to the magnetic field. This motion is commonly called precession and the reasons for it and the equations governing it may be found in any treatise on gyroscopes.

The problem is, in fact, exactly similar to that of a gyroscope acted on by gravity, in which case it is well known that the gyroscope does not fall over, but precesses with the axis, making a constant angle with the vertical. In the absence of friction or other damping, this precession would continue indefinitely and the gyroscope would never be oriented by the torque due to gravity.

The angular rate at which this precision occurs depends on the torque applied and the angular momentum, being larger for larger torques and for small angular momenta. Thus, in the nuclear case, the rate of precession is proportional to $\mu H/I$, its actual value being $(e/2Mc)(\mu H/I)$. It will be observed that this frequency is independent of the angle which the nuclear moment makes with the field H. This frequency of precession is often called the Lamor frequency.

Thus we see that, in the absence of damping forces, nuclei when placed in a magnetic field would not line up therewith but would precess continually about the axis established by the magnetic field. Actually, damping forces do exist, as has been discovered by Bloch, Hansen, Purcell, et al. and just as friction on a gyroscope eventually causes it to assume a position of lowest potential energy in the gravitational field, i. e., line up with the field, so these damping forces eventually suppress the nuclear precession and so allow the nuclear moments to line up with the magnetic field.

A quantity of great importance, for present purposes, is the time required for these damping forces to act, and this time we call the relaxation time. Experiment shows that this time may have values extending from $10^{-5}$ seconds or less to many minutes or more.

In addition to the gyroscopic and magnetic forces, and the damping forces, as described above, there exists a third type of effect of importance; namely that due to thermal motion. It is well known that, as a result of such motions, the probability that a system in equilibrium with its surroundings at absolute temperature T will have an energy E is proportional to $e^{-E/kT}$ where $k$ is Boltzman's constant. As a result, it is most probable that any given system will choose, for example, the lowest of two possible energies. The difference in probabilities will be small if the energy difference is small compared to $kT$ and vice versa.

In the case of present interest, the energy that the nucleus can gain in aligning itself with the magnetic field is of the order of $\mu H$ and, on substituting numbers, it will be found that this is about a million times less than $kT$. As a result, although any nucleus is most stable when lined up with the magnetic field, and although the damping forces permit it to so line up, the resulting stability is so small compared to the energy $kT$ of thermal agitation that the orientation is determined mostly by chance and only slightly by the magnetic torque between the nuclear moment and the magnetic field. Thus, if we considered 1,000,001 nuclei of spin 1½ in a magnetic field of 1000 gauss or thereabouts, we might find 500,001 pointed with the field and 500,000 pointed against. The exact value of the difference depends, of course, on the moments, fields and temperatures involved, but the above numbers are representative.

It might be thought that the description of the behavior of an ensemble containing 500,000 nuclei pointed one way and 500,001 pointed in the opposite way would be quite complex. Actually it is surprisingly simple, for all the nuclei precess at the same rate, so one can cancel the 500,000 moments pointed against the field by 500,000 of the 500,001 oppositely oriented but similarly precessing nuclei. The end result is exactly the same as though there was a single nucleus aligned with the field, the other simply cancelling off. The uncancelled moments produce a rotating magnetic field component of the frequency of precession which will induce an alternating current in a suitably situated pickup coil.

To summarize: The combined effect of the nuclear angular momentum and the torque exerted by a magnetic field on the nuclear magnetic moment is to cause the nucleus to precess at a frequency called the Lamor frequency. This precession would continue indefinitely were it not for damping forces which allow the nucleus to line up with the field. Finally, because of large thermal forces which tend to give random orientations to the nuclei, the total orientation achieved by the torque acting on the nuclear moment is quite small.

We may also state that, with the exception of the effect of thermal forces, all the things we have described as happening to nuclei in a magnetic field in consequence of its angular momentum and the torque due to its magnetic moment are also known to happen to an ordinary gyroscope when acted on by similar torques.

In a previous application by Bloch and Hansen, Serial No. 718,092 filed December 23, 1946, precession of the nuclei is effected by use of a rotating component of magnetic field. In the present invention, this rotating field is not used. Two magnetic fields are involved, one of which is a strong field which need not be very homogeneous which we will refer to as the polarizing field, whereas the other field is usually the field to be measured. It is usually, though not necessarily, a weaker field, and must have a high degree of homogeneity, in order for the present invention to achieve its potentially high sensitivity.

In the present invention, the polarizing field is applied to the sample so as to polarize the atomic nuclei at an angle with respect to the precessional field or field to be measured. The polarizing field is then quickly shut off, leaving the polarization produced by the polarizing field to precess about the precessional field. It is required that the polarizing field shall be shut off in a time short compared to the relaxation time of the nuclei previously discussed. This requirement will be obvious if it is considered that there will be little or no polarization left if the polarizing field is shut off so slowly that the polarization can die out as the field decreases. It is also required that the polarizing field be reduced from a value equal to the precessional field to zero in a time short compared to one cycle of the nuclear precession. This requirement is not quite so obvious and no full explanation will be attempted here. It is well known, however, from the theory of precessing gyroscopes that the axis around which precession takes place is parallel to the direction of the forces constituting the applied force couple causing the precession. If the direction of the applied force couple changes by only a small angle in each precession cycles, the axis around which precession takes place will follow quite exactly. Obviously the direction of the force couple during the time when the polarization field is decreasing is the resultant of the residual polarizing field and the field to be measured. The resultant does not begin to change its direction rapidly until the dying polarizing field and the field to be measured are of comparable magnitude. Since the nuclei precessing around the resultant field are equally distributed in all phases, their average direction of polarization is in the direction of the resultant field. If the polarization is allowed to follow the resultant field until only the field to be measured is left, the polarization will be lined up with the field to be measured, and therefore will not precess. To avoid this result, a large change in the direction of the resultant must occur in a time short compared to a cycle of the precession frequency. This is equivalent to the requirement above stated that the polarizing field be reduced from a value equal to the field to be measured to zero in a time short compared to a cycle of the precession frequency. Both these conditions are easily met in practice.

The figures in this case are numbered 1 to 12.

Like reference characters are utilized throughout the drawings to designate like parts.

Figure 1:
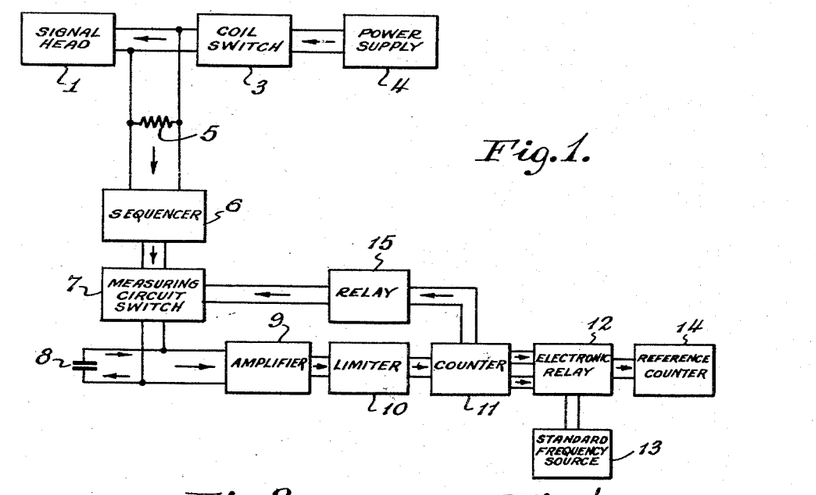
Fig. 1 is a block diagram intended to show the functional interrelationship of the various components of the apparatus.

Referring to Fig. 1, 1 is a signal head containing a sample of matter of known nuclear character and a surrounding large coil of wire which serves the double purpose of applying a strong magnetic field to the sample, to produce nuclear polarization of the same, and to pick up the signal produced by precessing atomic nuclei. After polarization has been produced by a current flowing from a power supply 4, a coil switch 3 or electronic gate is opened and abruptly terminates the current flow. The switch 3 may be either electrically or mechanically activated. When the switch 3 is opened, a high voltage appears across the coil of the signal head 1 because of its inductance. This voltage is prevented from reaching dangerous proportions by a resistive element 5. This may be an ordinary resistor, but is preferably some form of non-linear resistor, such as thyrite. This will produce a more rapid drop in the field of the coil than can be produced by a common resistor. A short time after the opening of the switch 3 (long enough for the current in the coil to decrease to zero), a measuring circuit switch 7 is closed connecting an amplifier 9 and a condenser 8 to the coil. The time interval between the opening of the coil switch 3 and the closing of the measuring circuit switch 7 is determined by a time delay switch or sequencer 6 which may be either electrical or mechanical mechanism for sequencing these two switching operations with a suitable intervening time delay. The condenser 8 is connected across the coil after the transients caused by cutting off the current have died. It forms a resonant circuit with the coil which is approximately tuned to the precession frequency of the nuclei in sample of the signal head 1. The precession frequency of the nuclei in sample 1 is determined by the nature of the nuclei and the strength of the magnetic field in which precession is taking place. Since in the form of the invention here illustrated, the object is to determine the strength of the last-mentioned magnetic field, the characteristics of the nuclei in the sample must be known. When the precession frequency of the nuclei is measured, the strength of the magnetic field is readily determined.

As has been previously explained, the precessing nuclei will induce an alternating voltage in the coil. When switch 7 is closed, this voltage will be impressed on the amplifier 9. The amplified signal from the amplifier 9 is limited by a limiter 10. The signal is thus transformed into a square wave. The amplifier 9 and the limiter 10 are shown separately because they represent separate circuit functions in spite of the fact that the two functions may, under some circumstances, be combined. The square wave (which is as square as the amplifier band width and the signal to noise ratio will permit) is then passed on to a counter 11. This is a counter of the best high speed design. It is not required to be able to record each individual number from 1 to its upper limit. If it is capable of recording numbers which are powers of 2, that will be satisfactory. The chief requirements of this counter are that it be very fast and that at the beginning and the completion of its count, it trip an electronic relay 12 so that a reference counter 14 will count the number of cycles of a standard frequency source 13, occurring during the count of a prescribed number of cycles of the square wave by the counter 11. At the conclusion of the count by counter 11, relay 15 is tripped which results in the opening of switch 7 permanently so it cannot start counting again. Thus the standard frequency source 13, the relay 12 and the counter 14 constitute an electronic stop-watch of very high speed and precision for counting the elapsed time during a prescribed number of cycles of the precession frequency of the nuclei. The standard frequency 13 may be obtained from a precise crystal controlled oscillator or it may be derived from a standard broadcast frequency. If the greatest accuracy is required, this frequency should be of the order of $10^3$ cycles per second. In order to obtain such high accuracy at such high frequency, it may be advantageous to multiply a lower frequency. The advantage of turning the signal obtained from the precessing nuclei into a square wave is that it is possible to determine the duration of a square wave of a given amplitude with much greater precision than is possible for a sine wave of the same amplitude.

Thus it is clear that the device here described first polarizes the nuclei of a sample of known atoms, then detects the precession, counts a prescribed number of precession cycles and measures the elapsed time to thus determine the precession frequency. When the precession frequency is determined, the magnetic field in which the nuclei are precessing, and which is the object of this embodiment of the invention to be measured, may be readily calculated.

Figure 2:
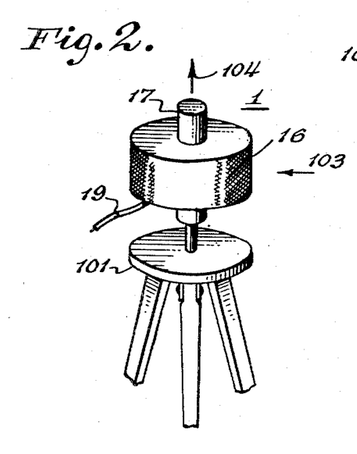
Fig. 2 represents the apparatus as set up to take measurements.

Fig. 2 is a sketch of the apparatus mounted for measurement of the strength of the earth's magnetic field.

The signal head 1 contains the coil and the sample of matter. This is mounted on tripod 101 and connected by coaxial cable 19 to the remainder of the circuit. The magnetic field to be measured, indicated by arrow 103, lies in the plane of the coil. The magnetic field produced by the coil for polarization of the sample is indicated by arrow 104. The nuclei of the sample are polarized along this axis. When the current in the coil is suddenly stopped, field 104 disappears leaving the nuclear polarization at right angles to the earth's field 103. The nuclei then start to precess thus transmitting an electric current of the frequency of precession to the remainder of the circuit. It should be noted that, although it is in general best to arrange the apparatus so that the polarizing field is at right angles to the field to be measured (the precessional field) a large amount of latitude exists.

Figure 3:
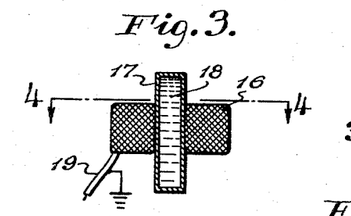
Fig. 3 is a cross-sectional view of one form of signal head.
Figure 4:
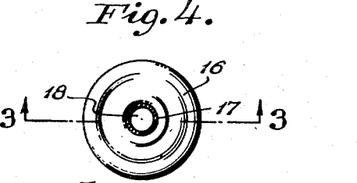
Fig. 4 is a cross-sectional plan view of the device of Fig. 3 taken along the line 4 of Fig. 3.

In Figs. 3 through 6 are shown two possible forms of the magnetizing and pick-up coil and the sample. It represents the contents of the signal head 1, Fig. 1. The coil 16 surrounds the sample container 17, which contains the liquid sample 18. The coil 16 is energized through a cable 19. Plan view, Fig. 4, is taken through line 4 of cross section Fig. 3, and cross-section view Fig. 3 is taken along line 3 of plan view Fig. 4.

Figure 5:
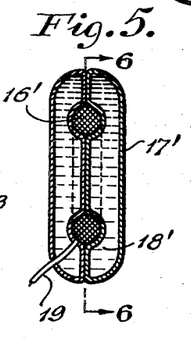
Fig. 5 is a cross-sectional view of another form of signal head.
Figure 6:
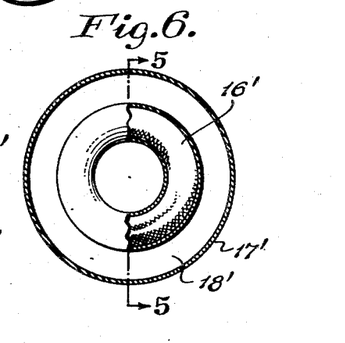
Fig. 6 is a cross-sectional plan view of the device of Fig. 5 taken along the line 6 of Fig. 5.

Figs. 5 and 6 illustrate another form of the signal head 1. Since, as has been explained, the strength of the signal is directly proportional to the cross-section of the sample and the strength of the polarizing field, a very appreciable increase in sensitivity may be had if the coil is surrounded by a sample both inside and outside.

Fig. 5 is a cross-section taken along line 5 of Fig. 6. Fig. 6 is a plan view taken along line 6 of Fig. 5. All primed numbers denote parts of similar function in Figs. 3 and 6. It will be noted that the container 17' is formed in two halves, which are each closed containers having their facing surfaces annularly recessed to cooperate with the coil 16'. To secure the respective portions of the container 17', clamping means (not shown) are provided. To facilitate the supporting of the signal head 1 of Figs. 3 through 6 by a tripod 101, mounting means cooperating with the container 17 may be employed.

Figure 7:
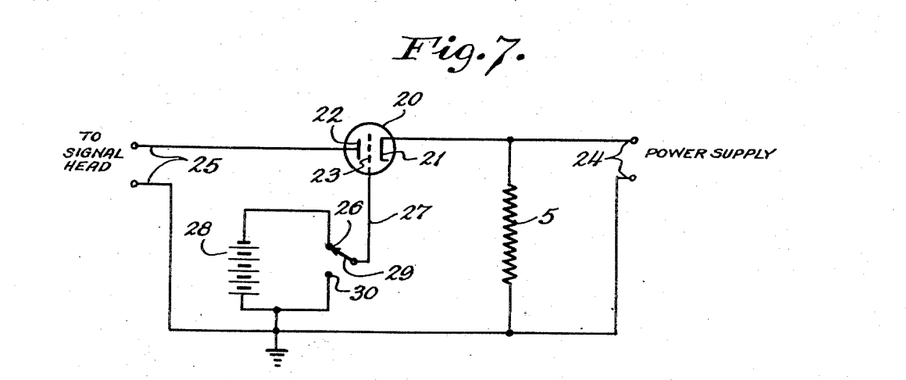
Fig. 7 is an electronic switch.

The coil switch 3 and resistor 5 are shown in Fig. 7. A tube 20 having a large current carrying capacity and high voltage rating has its cathode 21 connected by leads 24 to the power supply 4. Its plate 22 is connected by wires 25 to the cable 19, which in turn is connected to the coil 16 or 16'. The grid 23 is connected to the negative terminal 26 of a battery 28 by a wire 27 and a switch 29. In this state, the tube 20 is biased beyond cut-off and no current passes. When the switch 29 is thrown to the terminal 30, which is grounded, a large current passes, energizing coil 16 or 16' and polarizing the nuclei of the sample 18 or 18'. When the current has been flowing long enough to effect maximum polarization, the switch 29 is made to contact the terminal 26, and the energy of the magnetic field is rapidly dissipated in the resistor 5.

Simple calculation shows that a tube capable of withstanding 10,000 volts or so and suitable for passing 2 or 3 amps. with 100 volts drop, and capable of dissipating 300 watts, will be quite adequate. Such tubes are readily available.

The power supply 4 of Fig. 1 consists of a completely conventional unit for supply of the coil 16, 16' and for supply of the various thermionic tubes. It therefore is not shown in detail as it would add nothing to the understanding of this invention.

Figure 8:
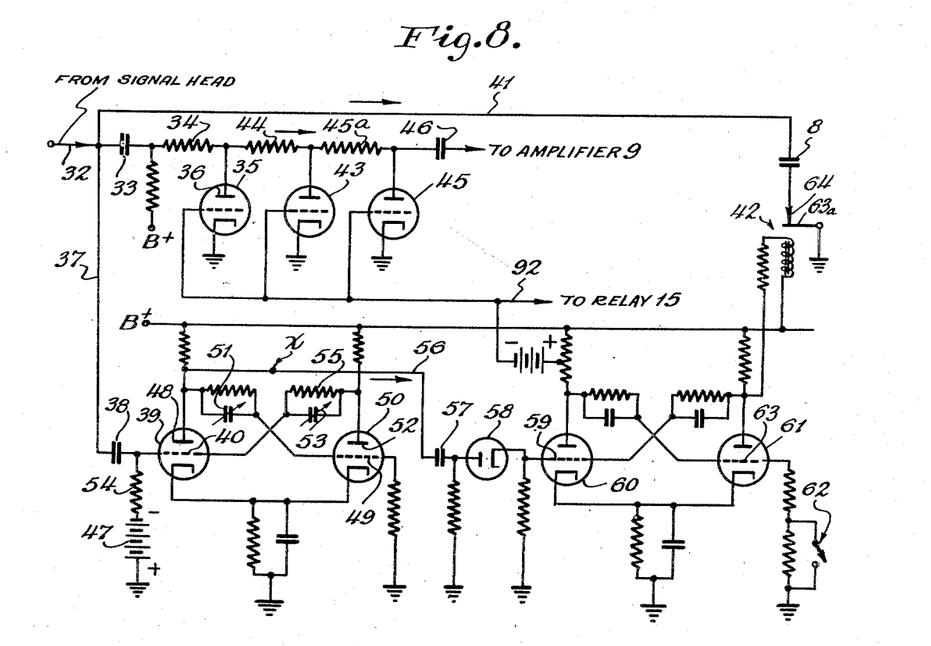
Fig. 8 is a combination of switch and time delay circuits.

Fig. 8 shows the time delay switch or the sequencer 6 and measuring circuit switch 7 of Fig. 1. The circuitry here is specially designed to carry out the present invention and is therefore shown in detail although the circuits shown are known in the radio art.

The signal emanating from the signal head 1 enters over lead 32 and divides, part of it going by way of condenser 33 and resistor 34 to the plate 36 of tube 35; part of it goes by way of lead 37 and condenser 38 to the grid 40 of tube 39; still another part goes via lead 41 through condenser 8 and relay 42 to ground.

When the set is first turned on, tubes 35, 43 and 45 are conducting, and since their plate impedances are very low compared to resistors 34, 44 and 45a, the signal will be attenuated to a very high degree before it passes through a condenser 46 to the amplifier 9 of Fig. 1. The number of attenuation stages may be varied to suit requirements. This attenuation network prevents any appreciable signal from reaching the amplifier 9 until tubes 35, 43 and 44 become non-conducting. Even the high voltages resulting from sudden stoppage of current in coil 16, 16' are attenuated to a negligible level.

When the switch 29, Fig. 7 is thrown from the negative terminal 26, to the grounded terminal 30, the current flow is suddenly interrupted, and a strong positive potential is induced on line 37. This momentarily overcomes the high negative bias applied to the grid 40 of tube 39 by battery 47 and allows tube 39 to pass a current. Plate 48 of tube 39 then becomes suddenly much more negative and thus a strong negative bias is applied to grid 49 of tube 50 through condenser 51, which renders this tube non-conducting. Plate 52 of tube 50 then becomes more positive, and maintains a positive bias on grid 40 through condenser 53 and resistor 55, thus keeping tube 39 in a conducting state. This state is not permanent however, because battery 47 must be overcome; this requires a continuous current through resistor 54. Resistor 55 is purposely made too high to supply this current. The current is therefore supplied by charging condenser 53. The current therefore gradually tapers off. Grid 40 gradually goes more negative until a voltage is reached at which plate 48 no longer biases grid 49 beyond cut-off. Tube 50 begins to conduct, biasing grid 40 more negatively, and tube 39 suddenly becomes non-conducting. Thus, after a certain elapsed time, the circuit of tubes 39 and 50 suddenly returns to its original state.

The time constant of this circuit may be changed at will by varying either condenser 53 or 51 or resistor 54 or 55. A suitable time constant for this circuit may be of the order of one second. It should be long enough to allow the transients caused by cutting off the current in coil 16, 16' to die out completely.

When the circuit of tubes 39 and 50 returns to its original state, a positive voltage is momentarily applied to lead 56 which transmits a positive potential through condenser 57 (which is small and therefore passes a current which is the derivative of the applied voltage) and diode 58 to grid 59 of tube 60. The circuit comprising tubes 60 and 61 and diode 58, together with the capacitors and resistors connected to them constitute a conventional flipflop circuit such as is used in counters. This circuit has two permanently stable states, one with tube 60 conducting and tube 61 non-conducting, and the other with tube 61 conducting and tube 60 non-conducting.

It is required that in the initial state tube 61 shall be conducting. Since tubes 60 and 61 are symmetrically arranged in every respect, it is impossible to tell which tube will conduct when the circuit is turned on, hence reset switch 62, which is normally closed, is provided. Opening switch 62 will put more resistance in series with grid 63, which will make this grid more positive and cause tube 61 to conduct, thus putting the circuit in proper initial state. This switch is then closed again.

When a positive impulse is transmitted to grid 59 by way of lead 56, tube 60 suddenly becomes conducting and tube 61 becomes non-conducting. This applies a strongly negative bias to the grids of tubes 35, 43 and 45, rendering these tubes non-conducting, and the signal entering through resistor 34 is passed on to box 9, Fig. 1, instead of being by-passed to ground. At the same time, the stoppage of the current in tube 61 stops the flow of current through relay 42, allowing armature 63a to rise and close switch 64. This throws the condenser 8 across the coil of the signal head 1, Fig. 1. The coil and condenser then form a resonant circuit which is approximately tuned to the precession frequency of the nuclei in sample 1, Fig. 1 in the field to be measured.

To recapitulate, a positive surge resulting from breaking the circuit through coil 16, Figs. 3 through 6, trips the flipflop circuit comprising tubes 39 and 50, tube 39 becoming conducting and tube 50 becoming non-conducting. The resulting surge, being negative, is blocked by diode 58 and so nothing happens at the time to the circuit comprising tubes 60 and 61. After a definite time interval, the circuit comprising tubes 39 and 50 flips back to its initial condition, transmitting a positive surge which is passed by diode 58 and trips the flipflop circuit comprising tubes 60 and 61. This renders tubes 35, 43 and 45 non-conducting, allowing the signal to pass to amplifier 9, Fig. 1. It also cuts in condenser 8. The entire circuit of Fig. 8 remains in this condition throughout the remainder of the time of operation.

Since the amplifier 9 is a perfectly conventional one, it is not shown. Its function is to bring the signal level up to a level at which the subsequent limiter will begin to act.

Figure 9:
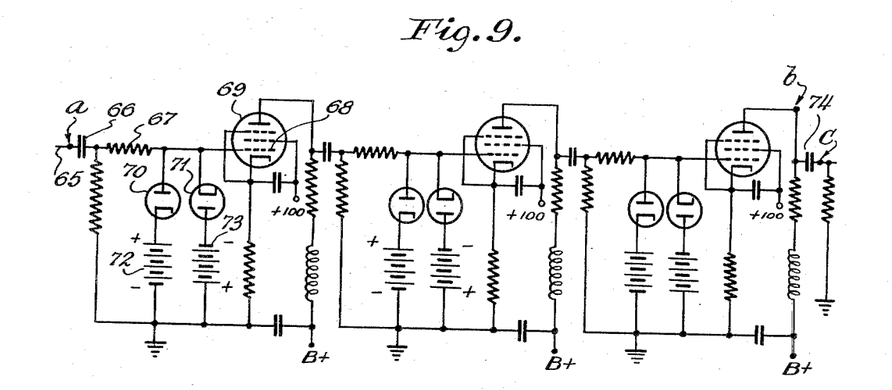
Fig. 9 is a wave squaring circuit.

Fig. 9 represents the limiter which is interspersed with stages of amplification. Since this consists of a series of cascaded stages, all of which are alike in principle, only the first stage need be described.

The signal enters on lead 65, passing through blocking condenser 66 and resistor 67 to grid 68 of tube 69. Diodes 70 and 71 are biased by batteries 72 and 73, so that for small signals they do not conduct, but when signals exceed a certain amplitude, one of them will conduct on the positive half cycle, and the other will conduct on the negative half cycle. When one of the diodes conducts, its impedance is low compared to resistor 67, and it constitutes a short to ground. Thus a wave is fed to tube 69 which has its tops cut off. This is amplified by tube 69 and passed to the next stage where the process is repeated. Amplifier tube 69 is arranged in a shunt peaked circuit of large band width so that all the harmonic content of the square wave may be passed. The screen and suppressor grids are connected in the usual way and an inductance is in series with the resistor in the plate circuit to improve the wide band characteristics. Careful attention should be paid to broad band characteristics in the later stages because the higher harmonics become more accentuated in each succeeding stage. Coupling condenser 74 is smaller than the others and acts as a differentiator. It changes the square wave into a series of spikes of alternately opposite sign.

Figure 9A:
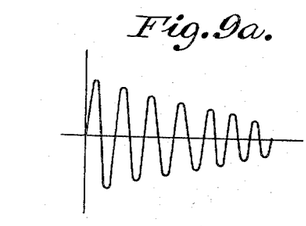
Figs. 9a, 9b and 9c are explanatory plots of wave forms appearing at points a, b and c, respectively, of the circuit of Fig. 9.
Figure 9B:
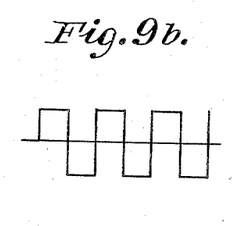
Figure 9C:
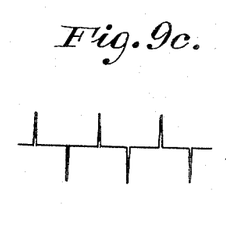

Figs. 9a, 9b and 9c represent the wave form of the signal at points a, b and c respectively of Fig. 9.

The signal then goes to the electronic counter 11 of Fig. 1, containing a conventional scale of 2 counter circuit which is well known in the art. The various stages are therefore represented in Fig. 10 as a series of boxes instead of in full detail.

Figure 10:
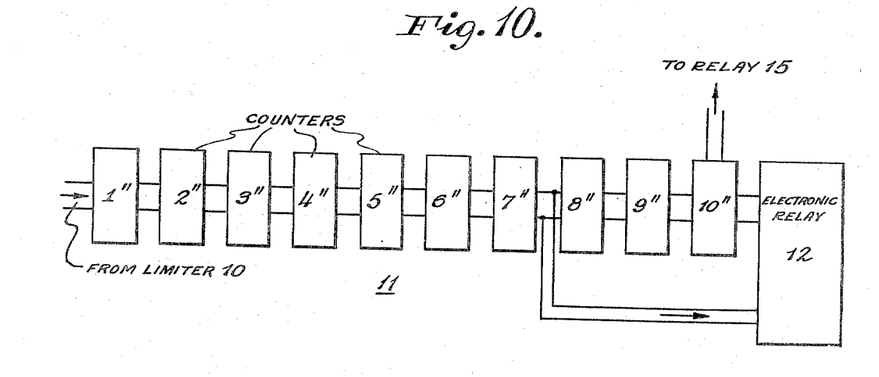
Fig. 10 is a part of a counter and timing circuit.

A scale of 2 counter consists of a series of flip-flop circuits arranged so that the second stage flips have as often as the first, the third flips half as often as the second, etc. The signal out of box 7" is scaled down in frequency by a factor of 128, and that out of 10" by a factor of 1024. Since there may be transient disturbances when the circuit first starts to count, it is advisable to allow the circuits to count a while before the count is used. Hence the starting signal to electronic switch 12 is taken from stage 7, which will be activated after 128 cycles have taken place. The stopping signal will come from the end of the chain which in this case will be actuated after 1024 cycles have passed. The number of cycles which have been compared to the standard frequency from box 13 is 1024—128=896 cycles. In Fig. 10, the leads from 7" and 10" both go to the electronic relay 12.

Figure 11:
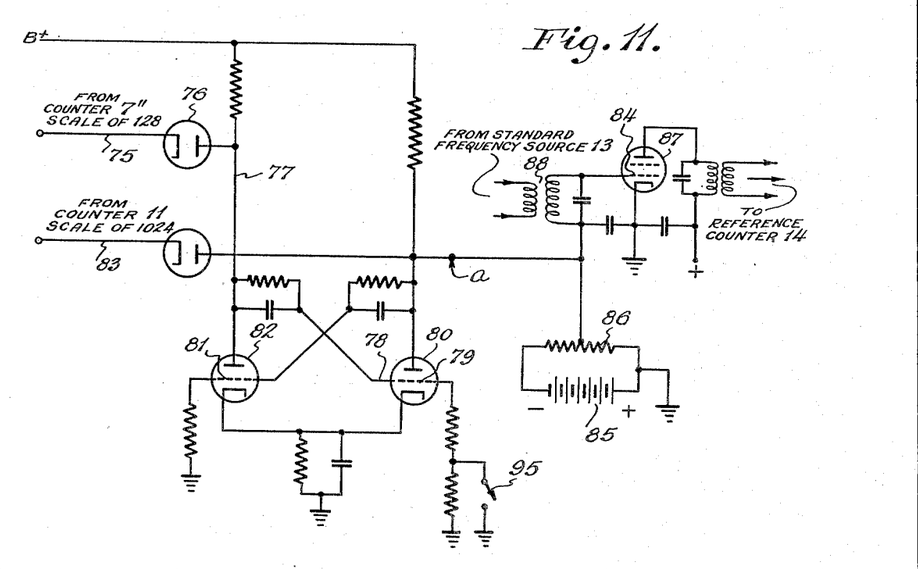
Fig. 11 is another part of a counter and timing circuit.
Figure 11A:
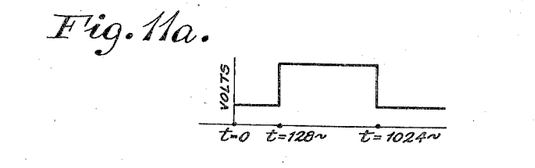
Fig. 11a is an explanatory plot of a wave form appearing at point a of Fig. 11.

Fig. 11 shows the contents of the electronic relay 12 of Fig. 1. A negative pulse is obtained from box 7", Fig. 11 by way of lead 75. Diode 76 passes negative pulses by way of leads 77 and 78 to grid 79; this stops the current flow in tube 80, which then applies a positive potential to grid 81 of tube 82 and renders it conducting. Subsequent negative pulses from the same source will have no further effect on the circuit. When the count in the counter 11 has reached 10", a negative pulse is transmitted to box 12 on lead 83; this biases grid 81 negatively and flips the circuit comprising tubes 80 and 82 back to its initial condition. When tube 80 is conducting, grid 84 is biased beyond cut-off by battery 85 and potentiometer 86. When tube 80 becomes non-conducting, grid 84 becomes much more positive and tube 87 becomes operative. It then transmits the frequency from the standard frequency source 13 to the reference counter 14, which frequency is supplied to tube 87 through transformer 88. The reference counter 14 contains a standard electronic counter which may be a scale of 2 counter or a scale of 10 counter as desired. Since the reference counter 14 contains a conventional counter similar to those which may be purchased on the market as a unit, there is no object in describing it in detail. Switch 95 is a reset switch which is identical in function to reset switch 62 which was described in Fig. 8.

A positive signal from box 10" goes to relay 15, Fig. 1, at the same instant the negative signal described above goes to electronic relay 12. It is obviously possible to obtain either a positive or negative signal from the type of flipflop circuit used in the present apparatus as counters and as switches.

Figure 12:
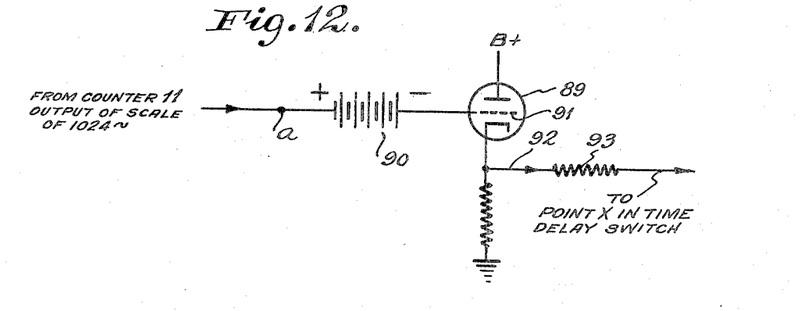
Fig. 12 is a part of a circuit to prevent renewed circuit activity after a count has been completed.

Relay 15, as shown in Fig. 12, consists of a single amplifying triode 89 which is biased beyond cut-off by battery 90. When the positive potential reaches grid 91, a current flows through the tube and a positive bias is applied to the grids of tubes 35, 43 and 45 by way of lead 92 and resistor 93. This bias is great enough to keep tubes 35, 43 and 45 in a conducting state in spite of negative biases which may be applied from the circuit containing tubes 60 and 61.

This bias assures that after the count has been completed, the circuit will not start a new count.

The standard frequency source 13 will contain either an oscillator of very stable frequency but quite conventional design, or a radio receiver of conventional design to pick up a broadcast standard frequency; it is not necessary to show detail of the circuit.

Modifications of the apparatus heretofore described may take numerous forms. Where it is desired to measure the gradient of the earth's magnetic field rather than the field per se, two of the previously described types of units may be employed simultaneously with the difference in the magnetic fields between the two indicated. To this end, two units may be provided with their counter circuits interconnected to obtain an indication of the difference. For somewhat lower sensitivity, it may not be necessary to use counters. This signal from one unit may be put on one sweep of an oscillograph and that from the other unit on the sweep at right angles.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The method of measuring magnetic fields which comprises the steps of applying a polarizing magnetic field to the nuclei of a sample of matter at an angle with respect to the magnetic field to be measured, causing said nuclear polarization to precess entirely under the influence of said field to be measured, and measuring said precession frequency.

2. The method of measuring magnetic fields comprises the steps of applying a magnetic field to the nuclei of a sample of matter to constrain a preponderance of the nuclei of the sample to point in a particular direction, removing the field causing said constraint and measuring the frequency of nuclear precession of said preponderance in the magnetic field to be measured.

3. The method of correlating the gyromagnetic properties of atomic nuclei with a magnetic field, which comprises the steps of applying a polarizing magnetic field for constraining a predominance of the nuclei of a sample of matter to point in a particular direction, removing the field causing said constraint, determining the precession frequency of said predominance and measuring the strength of said field.

4. The method of correlating the gyromagnetic properties of atomic nuclei with a magnetic field, which comprises the steps of applying a polarizing magnetic field for constraining a predominance of the nuclei of a sample of matter having a known nuclear gyromagnetic ratio to point in a particular direction, removing the field causing said contraint and measuring the frequency of nuclear precession in said field.

5. Apparatus for correlating the gyromagnetic properties of atomic nuclei with the strength of a first magnetic field comprising a sample of matter having nuclei of known gyromagnetic properties, means for creating and quickly removing a second magnetic field to cause a predominant orientation of said nuclei in a particular direction, and means for detecting the precession frequency of said predominant orientation in said first magnetic field after removal of said second field.

6. Apparatus for correlating the gyromagnetic properties of atomic nuclei possessing a gyromagnetic ratio with the strength of a magnetic field, comprising means for creating and quickly removing a magnetic field to cause a predominant orientation of said nuclei in a particular direction, means for maintaining a magnetic field of known strength after said first field is removed, and means for detecting the precession frequency of said predominant orientation in said second magnetic field.

7. Apparatus for measuring a weak magnetic field comprising a coil of wire, the axis of which makes an angle with respect to the field to be measured, means for supplying an electric current to said coil and for quickly terminating the flow of said current, means for supporting a sample of matter in said coil, means for detecting nuclear precession in said sample in the magnetic field to be measured after the termination of said current flow, and means for determining the frequency of said precession.

8. Apparatus as in claim 7 wherein the frequency determining means comprises means for counting the number of cycles of a standard frequency during a prescribed number of cycles of said nuclear precession frequency.

9. In apparatus for measuring a magnetic field, a signal head including a sample of matter and a coil, said sample of matter having known nuclear properties, a source of power, a first control means for connecting said power source to said coil to polarize the nuclei of said sample of matter, a frequency measuring circuit, and second control means for connecting said coil to said frequency measuring circuit, whereby the precession frequency of said nuclei is detected.

10. In magnetic field measuring apparatus, a sample of matter having predetermined gyromagnetic properties, a coil located adjacent said sample, a source of power, means including a coil switch for controllably connecting said power source to said coil to energize said coil at desired intervals, a resistor connected across said coil to control the current flow upon the opening of said coil switch whereby the nuclei of said sample are polarized, a frequency detecting circuit also connected across said coil, sequencer means interposed between said coil and said frequency detecting circuit for connecting said coil and circuit upon the decrease of the current in said coil to substantially a value of zero, whereby the precession frequency of the nuclei of said sample precessing under the influence of an unknown magnetic field is indicated.

11. Apparatus as in claim 10 wherein said frequency detecting circuit comprises a condenser which forms a resonant circuit with said coil, said resonant circuit being tuned approximately to said precession frequency, an amplifier, a limiter, a counter, said amplifier, limiter and counter being connected in series to said tuned circuit.

12. Apparatus for measuring the gradient of an unknown magnetic field comprising a pair of signal heads located at spatially separated points in said unknown field, said signal heads each having a sample of matter of known nuclear properties and a coil located adjacent said sample, a source of power controllably connected to said coil to independently effect a polarization of the respective nuclei of said samples, a pair of frequency detecting means for detecting the precession frequency of said nuclei of said respective samples under the influence of said unknown field, and comparitor means connected to said frequency detecting means for indicating the difference of said precession frequencies of said respective samples, whereby the magnetic field gradient is determined.

13. Apparatus for measuring a weak magnetic field as defined in claim 7 wherein said coil of wire is of toroidal shape and wherein said means for supporting a sample of matter in the coil comprises a container having respective portions with cooperating recessed faces, said recessed faces compactly supporting said coil.

RUSSELL H. VARIAN.

REFERENCES CITED

The following references are of record in the file of this patent:

UNITED STATES PATENTS

| Number | Name | Date |
| --- | --- | --- |
| 2,441,380 | Zuschlag | May 11, 1948 |
| 2,447,911 | Mages et al. | Aug. 24, 1948 |